(12) United States Patent
Brezina et al.

(10) Patent No.: US 7,574,847 B2
(45) Date of Patent: Aug. 18, 2009

(54) METHOD OF FORMING A SEAL KIT

(75) Inventors: Ron C. Brezina, North Richland Hills, TX (US); Michael Deese, Southlake, TX (US)

(73) Assignee: Santech Industries, Inc., Fort Worth, TX (US)

( * ) Notice: Subject to any disclaimer, the term of this patent is extended or adjusted under 35 U.S.C. 154(b) by 660 days.

(21) Appl. No.: 11/175,618

(22) Filed: Jul. 6, 2005

(65) Prior Publication Data

US 2005/0242511 A1 Nov. 3, 2005

Related U.S. Application Data

(62) Division of application No. 10/461,019, filed on Jun. 13, 2003, now Pat. No. 7,325,809.

(51) Int. Cl.
*B65B 1/04* (2006.01)
(52) U.S. Cl. .......................................... 53/467; 53/469
(58) Field of Classification Search ................... 53/467, 53/469
See application file for complete search history.

(56) References Cited

U.S. PATENT DOCUMENTS

| | | | |
|---|---|---|---|
| 5,398,809 A | | 3/1995 | Henke et al. |
| 2008/0120945 A1 * | | 5/2008 | Holbrook et al. .............. 53/396 |

OTHER PUBLICATIONS

Sunair Products, Inc. 2002 Catalog, for Generic Labeled R012 to R-134a Retrofit Kits, p. 18-1.
FJC Catalog, O'Ring Assortments, pp. 32 and 33.
Plaintiff's Original Complaint, Case No. 2:08-cv-00181 styled *Santech Industries, Inc. v. FJC, Inc.*, in the United States District Court for the Eastern District of Texas Marshall Division, filed Apr. 29, 2008.
Notice of Dismissal With Prejudice, Case No. 2:08-cv-00181 styled *Santech Industries, Inc. v. FJC, Inc.*, in the United States District Court for the Eastern District of Texas Marshall Division, filed Jun. 26, 2008.
Plaintiff's Original Complaint, Case No. 2:08-cv-00240 styled *Santech Industries, Inc. v. Global Parts Distributors, LLC*, in the United States District Court for the Eastern District of Texas Marshall Division, filed Jun. 18, 2008.

(Continued)

*Primary Examiner*—Hemant M Desai
(74) *Attorney, Agent, or Firm*—Bracewell & Giuliani, LLP

(57) ABSTRACT

A seal kit for vehicle air conditioning systems and associated methods are provided. The seal kit includes a container and a set of a plurality of retrofit seals positioned in the container and adapted to retrofit a set of a plurality of existing seals of any one preselected group of different vehicle air conditioning systems corresponding to a preselected group of different vehicles. The seal kit simplifies and shortens the selling cycle by condensing multiple similar vehicles' seal requirements into kits allowing the ready identification of system seals by year, make, model, and when applicable, engine type. The condensing of individual components or seals into kits also allows reduction of inventory. The identification by year, make, model, and engine type speeds the selling process by quickly identifying the necessary kit and allowing one kit to be sold instead of multiple components or seals.

39 Claims, 12 Drawing Sheets

OTHER PUBLICATIONS

Notice of Dismissal With Prejudice of Dismissal, Case No. 2:08-cv-00240 styled *Santech Industries, Inc.* v. *Global Parts Distributors, LLC*, in the United States District Court for the Eastern District of Texas Marshall Division, signed Aug. 19, 2008.

Order of Dismissal, Case No. 2:08-cv-00240 styled *Santech Industries, Inc.* v. *Global Parts Distributors, LLC*, in the United States District Court for the Eastern District of Texas Marshall Division, signed Aug. 25, 2008.

Plaintiff's Original Complaint, Case No. 2:09-cv-00095 styled *Santech Industries, Inc.* v. *IDQ Operating, Inc. d/b/a Interdynamics*, in the United States District Court for the Eastern District of Texas Marshall Division, filed Apr. 6, 2009.

\* cited by examiner

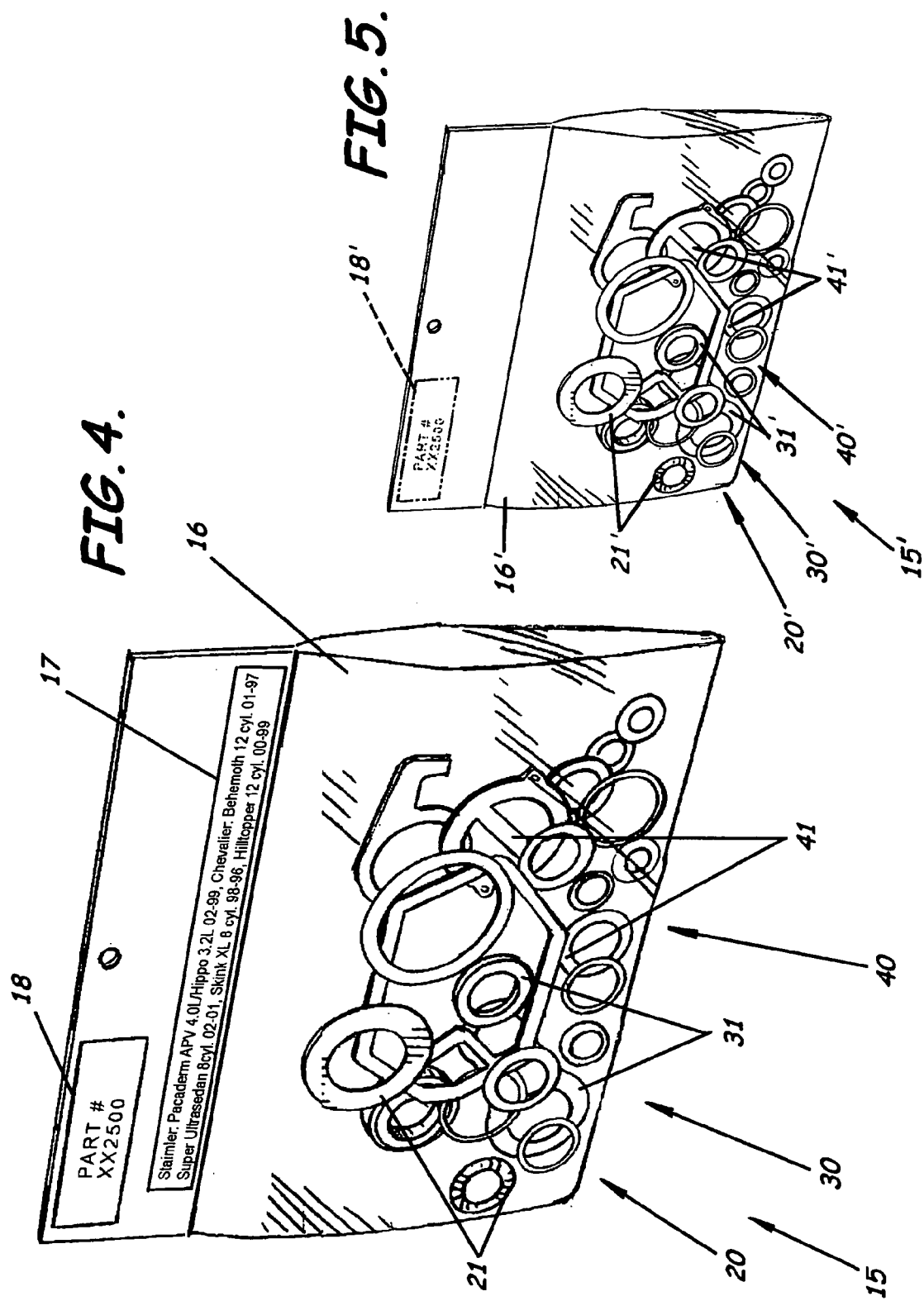

| Database | | Search | | Go |
|---|---|---|---|---|

| Part Number | Model |
|---|---|
| XX2500 | Stalinter: Pachyderm APV 4.0L/Hippo 3.2 L 02-99, Chevalier: Behemoth 12 cyl. 01-97", Super Ultrasedan 8 cyl. 02-01, Skink XL 8 cyl. 98-96, Hilltopper 12 cyl. 00-99 |
| XX2501 | Gibralter: General 3.2L 6cyl. 93-89, Dirge: Farraday 2.5L 00-96 |
| XX2502 | Gibralter: General 3.6L 8 cyl., Dirge: Farraday 95-94 w/All Eng. 93-89 w/4 cyl. |
| XX2503 | Dirge: Buckle Pickup 4 cyl. 00-92, Fullsize Pickup 6 cyl./8 cyl. 02-94 |
| XX2504 | Dirge: Van Fullsize 6.0L 01-81-includes rear A/C |
| XX2505 | Dirge: Pickup Fullsize 6.0L 93-92 |
| XX2506 | Jupiter: Perch 2.0L 02-86, Washington 3.0 8cyl. 94-84, Lentil: Contender 1.9L 02-89 |

*FIG. 6.*

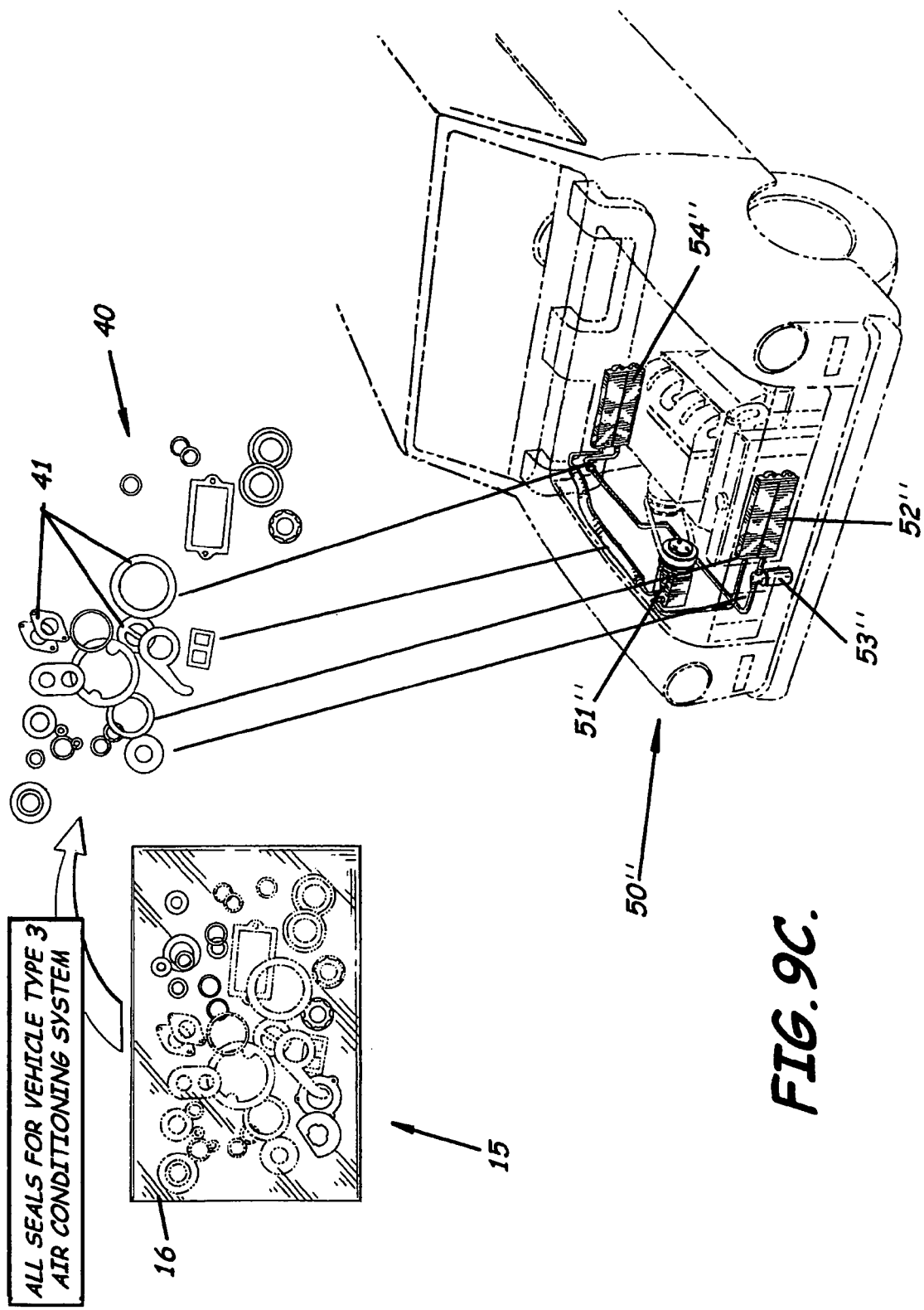

| Part # | Model |
|---|---|
| XX2500 | Stainler: Pacaderm APV 4.0L/Hippo 3.2 L 02-99, Chevalier: Behemoth 12 cyl. 01-97' Super Ultrasedan 8 cyl. 02-01, Skink XL 8 cyl. 98-96, Hilltopper 12 cyl. 00-99 |
| XX2501 | Gibralter: General 3.2L 6cyl. 93-89, Dirge: Farraday 2.5L 00-96 |
| XX2502 | Gibralter: General 3.6L 8 cyl., Dirge: Farraday 95-94 w/All Eng. 93-89 w/4 cyl. |
| XX2503 | Dirge: Buckle Pickup 4 cyl. 00-92, Fullsize Pickup 6 cyl./8 cyl. 02-94 |
| XX2504 | Dirge: Van Fullsize 6.0L 01-81-Includes rear A/C |
| XX2505 | Dirge: Pickup Fullsize 6.0L 93-92 |
| XX2506 | Jupiter: Perch 2.0L 02-86, Washington 3.0 6cyl. 94-84, Lentil: Contender 1.6L 02-86 |
| XX2507 | Jupitr: Renter4 cyl. 87-82, Restin 4 cyl. 87-82, Gibbon 6 cyl. 91-82, Mektor: Cinnamon 4 cyl. 91-82 |
| XX2508 | Chevalier: Illuminator 3.2L 96-90, Melon 2.0L 96-90, Super Wagon 4.0L 95-91 |
| XX2509 | Chevalier: Mountain Climber 12 cyl. 87-82, Badger 12 cyl. XPV 91-82, Conqueror 12 cyl. 87-79 |
| XX2510 | Beechik: Futurette 1.6L 03-99, Obvious 2.0L 03-99, Mont Claire 2.6L 99-93, Jupiter: Rancor 1.6L 01-98, Bloomer 1.8L 01-91-Includes Rear A/C |

FIG. 10.

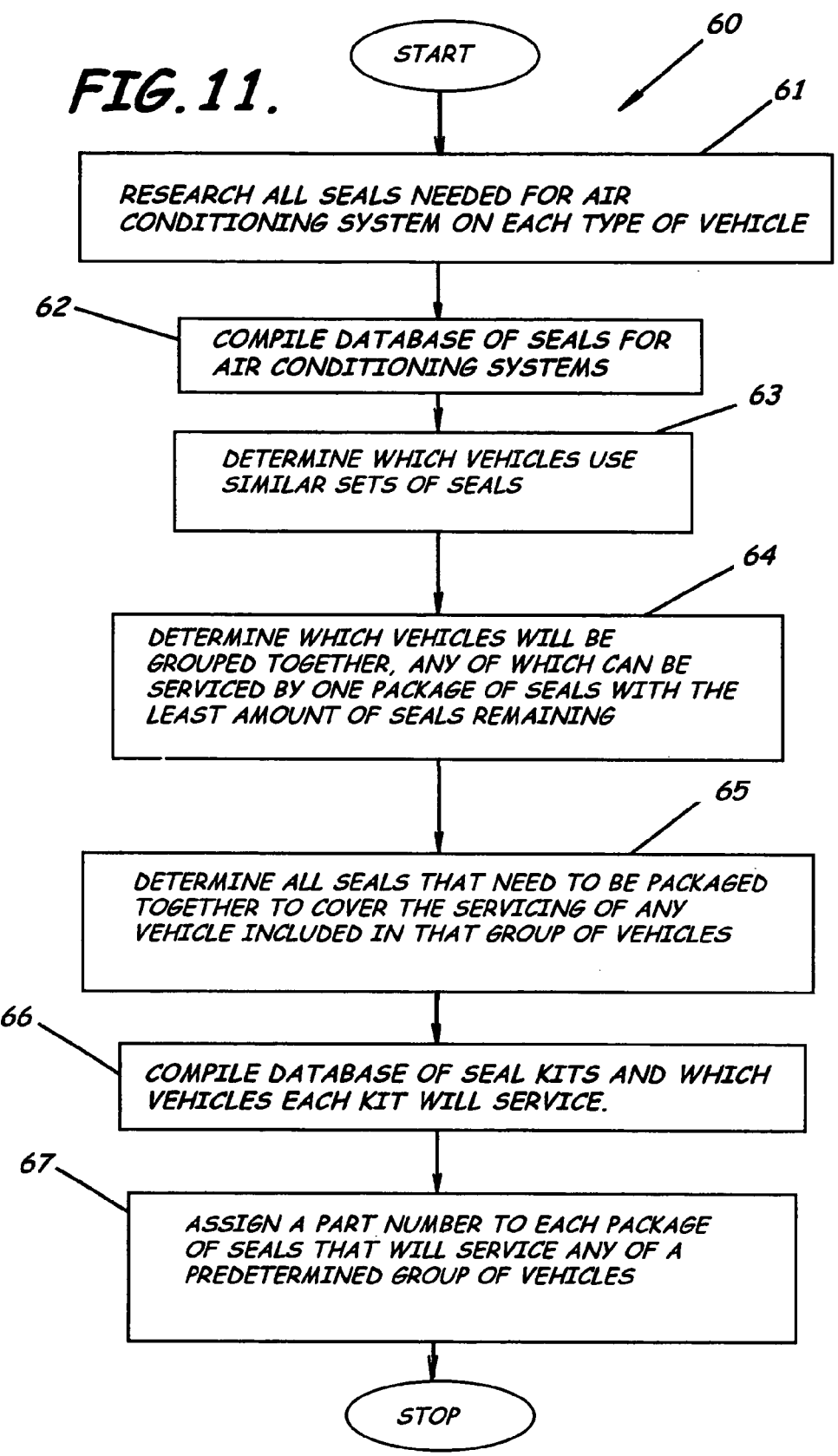

METHOD OF FORMING A SEAL KIT

RELATED APPLICATIONS

This application is a divisional of U.S. application Ser. No. 10/461,019, filed Jun. 13, 2003, now U.S. Pat. No. 7,325,809 issued on Feb. 5, 2008, which is incorporated herein by reference in its entirety.

BACKGROUND OF THE INVENTION

1. Field of the Invention

The present invention relates to the field of vehicles and, more particularly, to vehicle air conditioning systems and related methods.

2. Related Art

Seals used in sealing fluid circulation connections in vehicle air conditioning systems typically can be purchased only as an individual seal or as an assortment of similar seals in a container. The purchase of individual seals can be time consuming and expensive when a plurality of different seals used in making fluid circulation connections in a vehicle air conditioning system needs to be replaced. Also, trying to make sure that one of the seals purchased will actually retrofit or work for replacing an existing damaged seal, for example, can be difficult as well. Additionally, when a seal assortment is sold as a package, however, these assortments conventionally do not cover a plurality of different seals of a vehicle air conditioning system needed to replace the existing plurality of different seals in fluid circulation connections in the vehicle air conditioning system. It also can be difficult to determine which seals in an assortment package match or correspond to which types of vehicle air conditioning systems.

For example, in retail automotive part stores, such as AutoZone or Pep Boys, when an individual such as a vehicle owner attempts to purchase an o-ring seal used for sealing a fluid circulation connection of a vehicle air conditioning system such as a seal for connecting a hose or fluid line to a drier, a condenser, an evaporator, a compressor, an expansion valve, or an accumulator, the store personnel often will not know what the individual needs. As a result, the vehicle owner may attempt to bring the o-ring seal that needs replacing with them to the retail store. The store personnel then try to match the particular o-ring seal with one of numerous seals in a box kit full of different sizes of o-ring seals. This process often can take 20 minutes or longer and may not ensure that the vehicle owner leaves with the correct seal or any replacement o-ring seal at all.

Situations with vehicle dealer service or parts centers often are not much better. For example, if a vehicle owner goes to a dealer for an o-ring seal for an air conditioning system of a particular vehicle, the dealer personnel often attempt to look up the air conditioning system in some type of computer or microfiche system having numerous other parts and systems stored therein. This memory look up or retrieval process also often can be time consuming. Sometimes this process results in the identification of the original equipment manufacturer's part number for the seal and other times these seals are sold only with the component device part for the air conditioning system, e.g., drier, condenser, evaporator, compressor, expansion valve, or accumulator, associated with the air conditioning system. Then, it must be determined whether the individual o-ring seal is in stock, has to be ordered, or is even available from the dealer. Additionally, personnel of non-dealer affiliated installation garages likewise often have to go to retail automotive part stores or vehicle dealer or also themselves look through box kits full of different sizes of o-ring seals in hope of finding a desired replacement seal. This problem is then compounded or made significantly worse when trying to replace a plurality of different seals associated with the air conditioning system.

As a result, the process for replacing one or more seals in a vehicle air conditioning system clearly can be difficult, time consuming, frustrating, and expensive for both the vehicle owner and the retail automotive part store, vehicle dealer, vehicle part installation garage, and others involved in the seal replacement process.

SUMMARY OF THE INVENTION

In view of the foregoing, embodiments of the present invention advantageously provides a seal kit for a vehicle air conditioning system and associated methods that significantly reduce the time and expense associated with servicing or replacing seals, and particularly a plurality of seals, in a vehicle air conditioning system. Embodiments of the present invention also advantageously provides a seal kit for a vehicle air conditioning system and methods of forming and using a seal kit that has enough seals to retrofit, cover, or replace a plurality of air condition system connection seals of one of a plurality of preselected vehicle air conditioning systems. Embodiments of the present invention additionally advantageously provides a seal kit for a vehicle air conditioning system and methods of doing business with such seal kits that significantly reduces the inventory and shelf or floor space needed by distributors of seals for vehicle air conditioning systems. Embodiments of the present invention still also advantageously provides a seal kit for a vehicle air conditioning system that significantly reduces the time needed for distributors, such as retail automotive part stores, vehicle dealers, and vehicle part installation garages, and users of such seals, such as vehicle owners or users, personnel at vehicle dealer service centers, and personnel at vehicle part installation garages, to match seals needed for a vehicle air conditioning system, such as an air conditioning system, of a particular year, make, model, and/or engine type of a vehicle. Embodiments of the present inventions further provide a seal kit and related methods that provide all of the seals needed to make all or substantially all of a vehicle air conditioning system fluid connections when mounted in a vehicle More particularly, according to an embodiment of the present invention, a seal kit is provided which includes a container and a set of a plurality of retrofit seals positioned in the container and adapted to retrofit a set of a plurality of existing seals of any one preselected group of different vehicle air conditioning systems corresponding to a preselected group of different vehicles. Each vehicle air conditioning system of the preselected group of different vehicle air conditioning systems has the set of the plurality of existing seals defined by a plurality of existing seals used in making a plurality of air conditioning system fluid connections in one of the preselected group of different vehicles. The set of the plurality of retrofit seals has a total number of seals less than the entire set of a total combined number of seals needed to retrofit all sets of the plurality of existing seals needed to make all of the plurality of air conditioning system fluid connections in all of the preselected group of air conditioning systems.

According to another embodiment of the present invention, a seal kit is provided to retrofit a set of a plurality of existing seals of any one of a preselected group of different vehicle air conditioning systems corresponding to a preselected group of different vehicles. The seal kit includes a container and a set of a plurality of seals positioned in the container and adapted to retrofit all of a set of a plurality of existing seals of any one preselected group of different vehicle air conditioning systems corresponding to a preselected group of different vehicles. Each of the preselected groups of different vehicle air conditioning systems has a plurality of existing seals defined by a plurality of existing seals used in making a plurality of vehicle air conditioning system fluid connections in one of the preselected group of different vehicles. The seal kit can also include an indicator associated with the container to indicate the group of different vehicles to which the entire set of a plurality of seals operatively retrofits.

The present invention further provides an embodiment of a seal kit which includes a container and a plurality of subsets of a plurality of retrofit seals associated with the container to retrofit a plurality of existing seals of at least two different vehicle air conditioning systems. Each of the plurality of subsets of the plurality of retrofit seals is enough of a plurality of seals to completely retrofit a preselected group of seals used in making system fluid connections in at least one of the at least two different air conditioning systems. Also, each of the plurality of subsets can have at least one seal in common with at least one other of the plurality of subsets of the plurality of seals. The seal kit can also include an indicator associated with the container to indicate at least two different air conditioning systems to which the plurality of subsets operatively retrofit. By overlapping the seals within the individual sets or subsets, the total number of seals needed to be packaged and stored is greatly reduced. This can significantly reduce the costs involved in producing seals, reduce the inventory needed as well as shelf space or floor space, and enhance value to users by ensuring that a complete or substantially complete set of seals for making system fluid connections in a selected vehicle air conditioning system is provided.

An embodiment of the present invention also provides a method of forming a seal kit. A method of forming a seal kit includes providing a container and positioning a plurality of subsets of a plurality of seals for at least two different vehicle air conditioning systems within the container so that a combined total number of the plurality of seals of all of the plurality of subsets defines a set of a plurality of seals. Each of the plurality of subsets of the plurality of seals preferably is enough of a plurality of seals to completely retrofit all of the system fluid circulation connections of at least one of the at least two different vehicle air conditioning systems. Each of the plurality of subsets has at least one seal in common with at least one other of the plurality of subsets of the plurality of seals. The method can also include indicating at least two different air conditioning systems to which the plurality of subsets operatively retrofit.

Another method of forming a seal kit according to an embodiment of the present invention includes determining a first set of a plurality of seals needed to make system fluid connections in an air conditioning system of a first vehicle, determining a second set of a plurality of seals needed to make system fluid connections in an air conditioning system of a second vehicle, and determining a third set of a plurality seals needed to retrofit a set of the plurality of seals needed to make system fluid connections of only one of the air conditioning systems of the first and second vehicles. The total number of seals in the third set of the plurality of seals preferably is less than the total combined number of seals needed to retrofit all of the plurality of seals of both the air conditioning systems of the first and second vehicles. Also in the method, the total number of seals in the third set can be greater than a set of the plurality of seals of only one of the air conditioning systems of the first and second vehicles. The method also includes positioning the determined third set of the plurality of seals into a container. The method also can include associating an indicator, e.g., by use of a database, a look-up table, connected to the container, or positioned in the container, with the container to indicate the first and second vehicles to which the set of a plurality of seals operatively retrofits. The indicator preferably includes at least the make and model of each of the first and second vehicles.

An embodiment of the present invention additionally provides a method of using a seal kit. The method of using a seal kit includes opening a container having a set of a plurality retrofit seals positioned therein and needed to retrofit a set of a plurality of existing seals needed to make system fluid connections in only one vehicle air conditioning system of a plurality of vehicle air conditioning systems of a plurality of vehicles. The total number of seals in the set of the plurality of retrofit seals is less than the total combined number of seals needed to retrofit all of the existing seals needed to make system fluid connections in all of the plurality of vehicle air conditioning systems of the plurality of vehicles and greater than a set of the plurality of retrofit seals of only one of the air conditioning systems of the plurality of vehicles. The combination of the container and the set of the plurality of seals contained therein define a seal kit. The method also includes replacing at least one of the plurality of seals of the only one air conditioning system of the plurality of air conditioning systems of the plurality of vehicles with at least one corresponding seal from the seal kit.

An embodiment of the present invention further provides a method of doing business. The method of doing business includes providing a container having a set of a plurality seals needed to retrofit a set of a plurality of seals of only one air conditioning system of a plurality of air conditioning systems of a plurality of vehicles. A total number of seals in the set of the plurality of seals preferably is less than the total combined number of seals needed to retrofit a set of the plurality of seals of the air conditioning systems of the plurality of vehicles and greater than a set of the plurality of seals of only one of the air conditioning systems of the plurality of vehicles. The combination of the container and the set of the plurality of seals contained therein define a seal kit.

Another method of doing business also is provided which includes distributing a seal kit having at least one replacement seal contained therein as one of a plurality of seals. The seal kit indicates at least a plurality of makes and models, e.g., and can also include engine type, of a plurality of vehicles and has a set of the seals of a vehicle air conditioning system of any one of the plurality of vehicles contained therein to thereby reduce the time needed to select the at least one replacement seal for an air conditioning system of a particular make and model of a vehicle. The method can also include the seal kit having a container containing a set of a plurality seals needed to retrofit a set of a plurality of seals of only one air conditioning system of a plurality of air conditioning systems of the plurality of vehicles. A total number of seals in the set of the plurality of seals preferably is less than the total combined number of seals needed to retrofit a set of the plurality of seals of the vehicle air conditioning systems of the plurality of vehicles and greater than a set of the plurality of seals of only one of the vehicle air conditioning systems of the plurality of vehicles.

A method of doing business according to yet another embodiment of the present invention includes providing a seal kit having at least one of a set of a plurality of seals in the seal kit needed to make system fluid connections in a vehicle air conditioning system. The seal kit also is associated with an indication of at least one of a plurality of vehicles having the vehicle air conditioning system associated therewith to thereby reduce the amount of time needed to select the at least one replacement seal for the vehicle air conditioning system of a particular vehicle.

Accordingly, embodiments of the present invention advantageously provides a seal kit for a vehicle air conditioning system that has a complete set of seals for a range of vehicles, e.g., year, make, model, and engine type. The seal kit, for example, can advantageously have more seals than are needed for any one vehicle within the range of vehicles, but always has a compete set for any one vehicle within the range of vehicles. Notably, the seal kits are not used for separate individual vehicles and thereby save inventory and manufacturing costs by combining a plurality of vehicles in one seal kit and yet advantageously assuring that a set of the seals for each of the vehicles are included within the seal kit. Each seal kit, for example, can have at least one extra seal not needed in the vehicle air conditioning system of a vehicle in which one or more seals are to be replaced. If all seals in making system fluid connections in the vehicle air conditioning system have been replaced, then the at least one extra seal, for example, would be for another vehicle within the range or group of vehicles indicated in some manner as being associated with the seal kit.

Embodiments of a seal kit, according to the present invention, simplifies and shortens the selling cycle by condensing multiple similar vehicles' seal requirements into kits allowing the ready identification of system seals by year, make, model, and when applicable, engine type. The condensing of individual components or seals into kits also allows reduction of inventory. The identification by year, make, model, and engine type speeds the selling process by quickly identifying the necessary kit and allowing one kit to be sold instead of multiple components or seals.

BRIEF DESCRIPTION OF THE DRAWINGS

Some of the features, objects, and advantages of embodiments of the present invention having been stated, others will become apparent as the description proceeds when taken in conjunction with the accompanying drawings, in which:

FIG. 4 is a perspective view of a seal kit to make vehicle air conditioning system fluid circulation connections associated with a vehicle air conditioning system having an indicator associated therewith to indicate year, make, model, and/or engine type of a vehicle according to an embodiment of the present invention;

FIG. 5 is a perspective view of a seal kit to make fluid circulation connections associated with a vehicle air conditioning system having no indicator on a container thereof which indicates make, model, and/or engine type of a vehicle according to another embodiment of the present invention;

FIG. 6 is a front plan view of a user interface of a computer having software stored thereon of a system for indicating a seal kit to make system fluid circulation connections associated with a plurality of different vehicle air conditioning systems of a plurality of different vehicles according to an embodiment of the present invention;

FIG. 9C is a front plan view of the seal kit to make system fluid circulation connections for a vehicle air conditioning system of FIGS. 9A and 9B illustrating a set of a plurality of different seals of a vehicle air conditioning system of a third vehicle being removed therefrom and having additional seals remaining in the container of the seal kit according to an embodiment of the present invention;

FIG. 10 is a table illustrating part numbers of a plurality of seal kits to make system fluid circulation connections for a vehicle air conditioning system and each seal kit having a corresponding plurality of makes and models of a plurality of vehicles according to an embodiment of the present invention; and FIG. 11 is a flow chart of a method of forming one or more seal kits to make system fluid circulation system connections for a vehicle air conditioning system according to an embodiment of the present invention.

DETAILED DESCRIPTION

Figure 1:
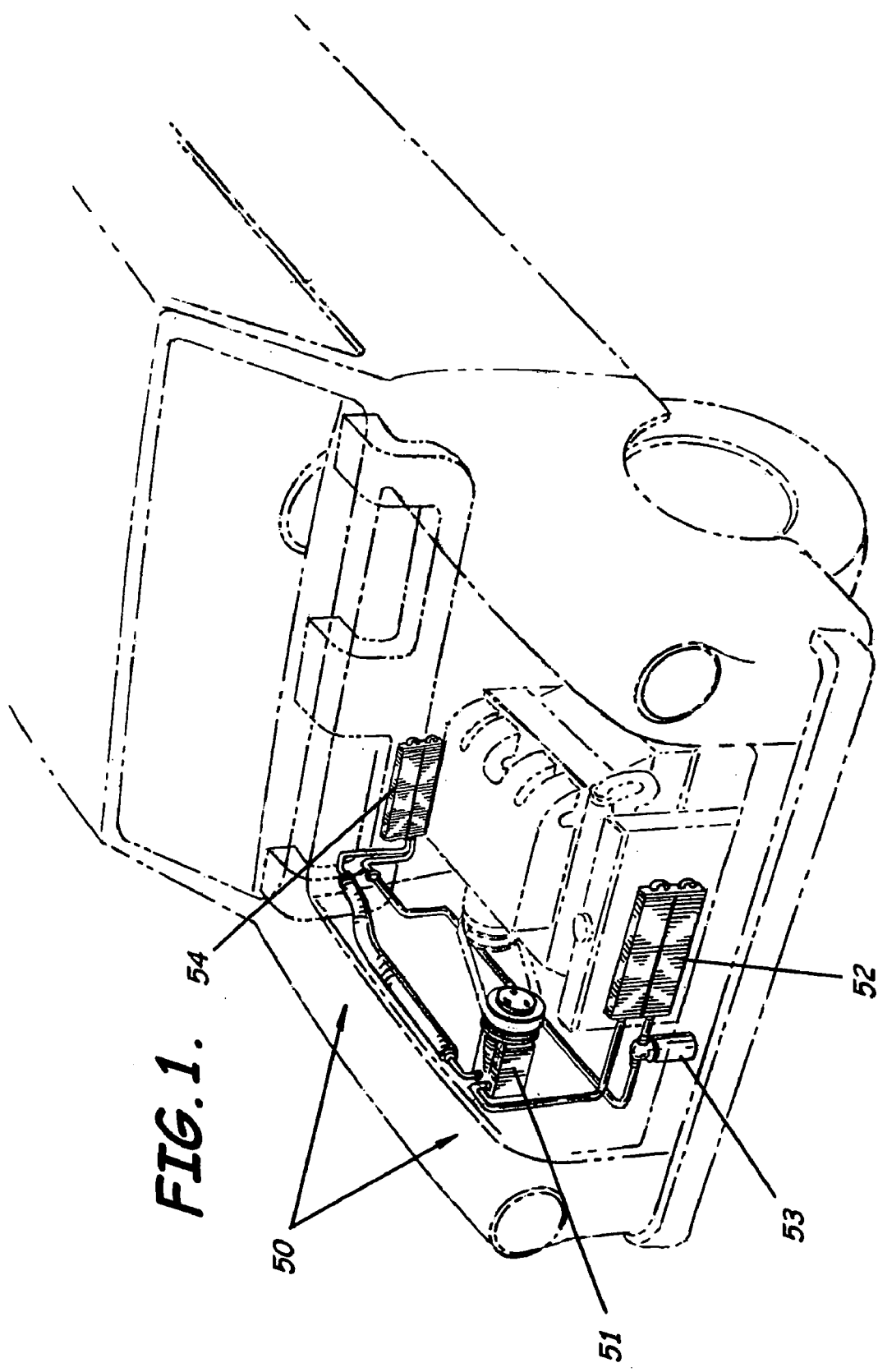
FIG. 1 is an environmental view of an air conditioning system of a vehicle having a plurality of seals associated with vehicle air conditioning system fluid circulation connections as defined by an embodiment of the present invention.
Figure 2:
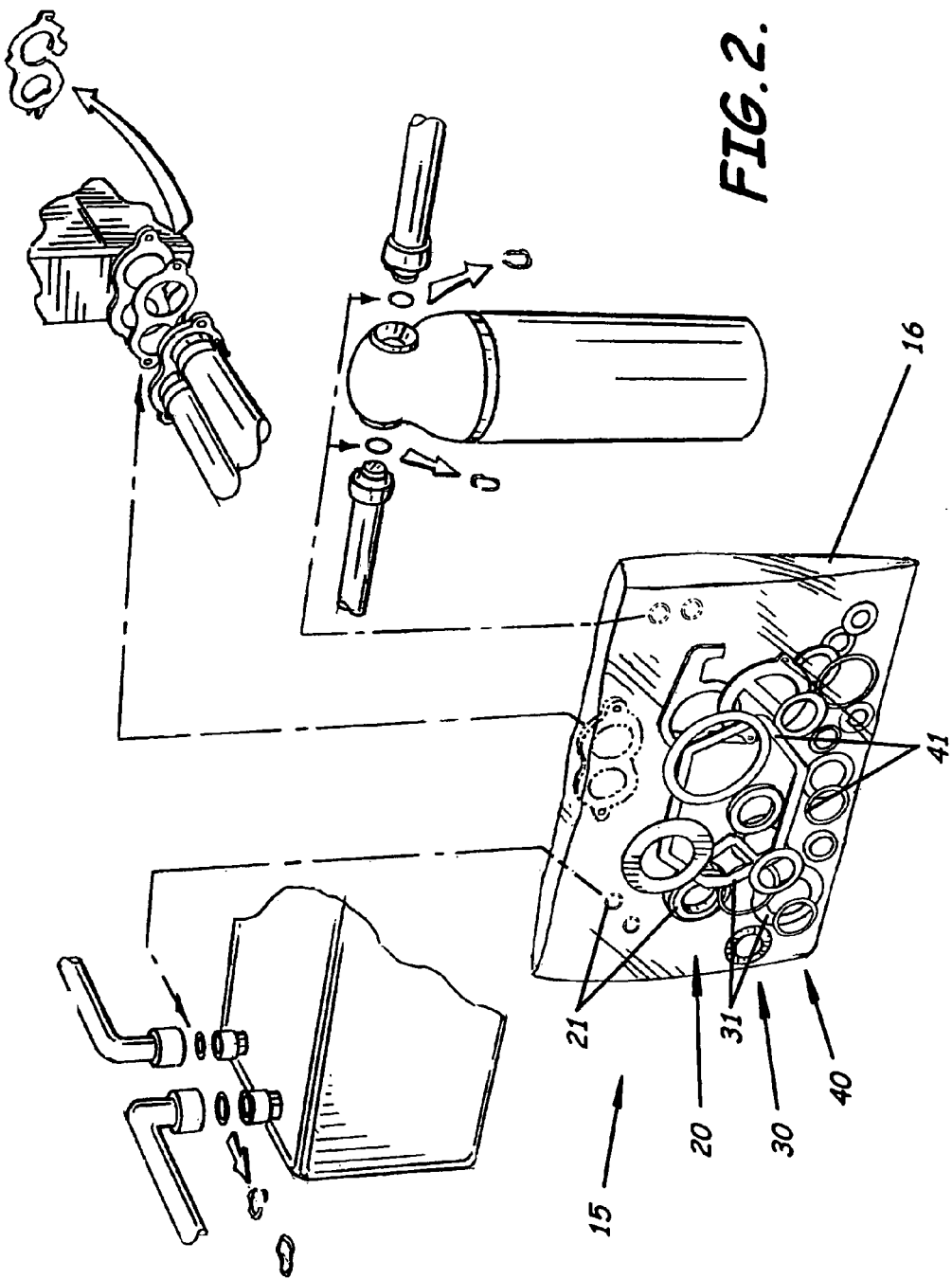
FIG. 2 is an exploded perspective view of a seal kit to make system fluid circulation connections of a vehicle air conditioning system illustrating a plurality of different seals positioned in a container and being retrofit into vehicle air conditioning system fluid circulation connections for a vehicle air conditioning system according to an embodiment of the present invention.

The present invention now will be described more fully hereinafter with reference to the accompanying drawings in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout, and prime or double prime notation, if used, indicates like elements in alternative embodiments.

FIGS. 1-10 illustrate embodiments of a seal kit 15 for a vehicle air conditioning system 50 according to the present invention. The seal kit 15 advantageously includes a container 16, e.g., preferably a single container such as a plastic bag as illustrated, a box, a sack, or other types of containers as understood by those skilled in the art, and a set (indicated by the combined numbers elements 20, 30, 40), of a plurality of retrofit seals 21, 31, 41, e.g., having different types, shapes, and sizes, positioned in the container 16 and adapted to retrofit a set of a plurality of existing seals of any one preselected group of different vehicle air conditioning systems 50, 50', 50" corresponding to a preselected group of different vehicles (see FIGS. 1, 7, 8, 9A-9C, and 10). Each vehicle air conditioning system of the preselected group of different vehicle air conditioning systems has the set of the plurality of existing seals defined by a plurality of existing seals used in making or needed to make a plurality of vehicle air conditioning system fluid circulation connections, and preferably all of the system fluid circulation connections, in one of the preselected group of different vehicles. The set of seals are preferably all of the seals necessary to seal system fluid circulation connections of a vehicle air conditioning system such as those connections at the dryer 53, 53', 53", condenser 52, 52', 52", evaporator 54, 54', 54", compressor 51, 51', 51", accumulator 55, expansion valve where used, and hose fittings 58 (see FIGS. 8-9C). These connections, for example, preferably do not include internal seals or integral seals such as valve cores, switch seals, shaft seals, compressor internal seals, compressor manifold internal seals (when the manifold is layered), orifice tube seals, accumulator internal seals, control valve seals, service cap seals, or sight glass gaskets. The set of retrofit seals, for example, are preferably and advantageously those seals needed by a mechanic to repair or retrofit the system fluid circulation connections of the vehicle air conditioning system as these are the types of seals commonly replaced. Although, in this embodiment, the description is related to system fluid circulation connections, it will be understood by those skilled in the art that the invention can include those seals needed to repair an individual component within the vehicle air conditioning system as well. Nevertheless, although not necessarily preferred, the inclusion of one or more seals needed to repair an individual component within the air conditioning system in the set of seals can form part of the invention as well as understood by those skilled in the art. In the embodiments illustrated and described herein, and by way of example, each of the individual subsets 20, 30, 40 of retrofit seals in combination form the entire set (referenced by numbers herein as the series of 20, 30, 40 together also) of the plurality of retrofit seals 21, 31, 41 (see FIGS. 7, 8, 9A, 9B, and 9C). The vehicle air conditioning systems 50, 50', 50" are described and illustrated herein primarily in terms of an air conditioning system which often has several different types and sizes of seals and in which a leakage in refrigerant or coolant fluid can often be critical. Nevertheless, as understood by those skilled in the art, other types of air conditioning systems can be used as well according to the present invention.

Each of the preselected groups of different vehicle air conditioning systems 50, 50', 50" has a predetermined set 20, 30, 40 of seals 21, 31, 41 which can be defined by at least one manufacturer of each of the preselected group of different air conditioning systems 50, 50', 50" components of an air conditioning system, by a vehicle manufacturer, or by an air conditioning system of component supplier, as being a set of the seals 21, 31, 41 of each of the preselected group of air conditioning systems 50, 50', 50" and corresponding to one of a preselected group of different vehicles (see FIGS. 5 and 9A-9C). The entire set 20, 30, 40 of a plurality of seals 21, 31, 41 also can include at least one more seal than needed to retrofit a set of the seals 21, 31, 41 of any one of the preselected group of the plurality of vehicle air conditioning systems 50. In other words, in the example as described and illustrated, when one of the subsets 20 is used to make a plurality of or all of the system fluid circulation connections within an air conditioning system 50, then other portions of other subsets still remain 30, 40. These other portions, however, preferably are not complete sets as some of the seals in one of the subsets (such as the subset 20, but also the other subsets 30, 40 as well) overlap with seals in the other subsets (such as the subsets 30, 40, but also the other subset 20 as well if one of the subsets 30, 40 are used). A total number of seals in the set of the plurality of seals 21, 31, 41 preferably is less than the total combined number of seals needed to retrofit all sets of the plurality of existing seals needed to make all of the plurality of air conditioning system fluid connections of all of the preselected group of air conditioning systems. By overlapping the seals 21, 31, 41 within the individual sets or subsets 20, 30, 40, the total number of seals needed to be packaged and stored is greatly reduced. This can significantly reduce the costs involved in producing seals, reduce the inventory needed as well as shelf space or floor space, and enhance value to users by ensuring that a complete or substantially complete set of seals for a selected air conditioning system is provided. The recognition that and provision of such an overlapping combination forms part of the present invention as well.

As illustrated, an embodiment of a seal kit 15 of the present invention includes a container 16 and a plurality of subsets 20, 30, 40 of a plurality of seals 21, 31, 41 for at least two different air conditioning systems 50, 50', 50" positioned in the container 16. Each of the plurality of subsets 20, 30, 40 of the plurality of retrofit seals 21, 31, 41 is enough of a plurality of seals to retrofit substantially all or all of the system fluid circulation connections, e.g., see FIG. 8, at least one of the at least two different air conditioning systems 50, 50', 50" and having at least one seal in common with at least one other of the plurality of subsets of the plurality of seals. The seal kit can 15 also include an indicator 17 associated with the container 16 to indicate at least two different air conditioning systems 50 to which the plurality of subsets operatively can be serviced, converted, replaced, or retrofitted (see FIGS. 4, 6, and 10). As shown in FIGS. 5-6, for example, an indicator can be stored in and displayed on a computer or microfiche user interface to provide a part number indication 18, 18' to a user. In other words, no indicator (17' or 18') may be on the container itself, but instead may be a look-up table or interface on a computer, book, database, or other data library as understood by those skilled in the art.

For example, according to an embodiment of the present invention, a seal kit 15, 15' is provided to retrofit a set 20, 30, 40 of a plurality of seals 21, 21', 31, 31', 41, 41' of any one of a preselected group of different vehicle air conditioning systems corresponding to a preselected group of different vehicles. The seal kit 15 includes a container 16 and a set 20, 30, 40 of a plurality of retrofit seals 21, 31, 41 positioned in the container 16 and adapted to retrofit a set of a plurality of existing seals of any one preselected group of different vehicle air conditioning systems corresponding to a preselected group of different vehicles. Each of the preselected groups of different vehicle air conditioning systems can have a predetermined set of existing seals defined by being a set of the existing seals of each of the preselected group of air conditioning systems and corresponding to one of a preselected group of different vehicles to make system fluid circulation connections therefore as understood by those skilled in the art. The total number of retrofit seals in the set of the plurality of seals 20, 30, 40 preferably is less than the total combined number of seals needed to retrofit all sets of the plurality of the existing seals needed or used to make all of the plurality of air conditioning system connections of all of the preselected group of vehicle air conditioning systems. The set of a plurality of seals 20, 30, 40 preferably includes at least one more seal than needed to entirely retrofit a set of the seals of any one of the preselected group of the plurality of vehicle air conditioning systems 50, 50', 50". The at least one more seal can be a seal adapted to retrofit a seal in another one of the plurality of vehicle air conditioning systems in the preselected group. A smaller set or subset of the seals of each of the plurality of vehicle air conditioning systems 50, 50', 50" is included within the set of a plurality of seals 20, 30, 40, and the set only has enough seals to retrofit only one of any one of the plurality of vehicle air conditioning systems 50, 50', 50". Also, at least two of the plurality of seals 20, 30, 40 of the set preferably have different shaped outer perimeters. In other words, the plurality of seals 20, 30, 40 with the entire set can advantageously have different shapes and sizes as illustrated.

As perhaps best shown in FIG. 4, the seal kit 15 can also include an indicator 17 associated with the container 16 to indicate the group of different vehicles to which the entire set 20, 30, 40 of a plurality of seals operatively retrofits. The preselected group of vehicles indicated by the indicator 17 associated with the container 16 includes at least the make and model, and also preferably engine type, of each of the vehicles in the preselected group of vehicles. The indicator 17 is positioned in at least one of the following locations: on an indicator portion attached to the container 16, on an outer surface of the container 16, within the container 16, on at least one of the plurality of seals 20, 30, 40 within the container 16, adjacent the container 16 such as on a separate sheet, document, label, shelf, or other region adjacent the container 16, or associated with the container 16 such as in separate reference material, a printed table, a handbook, a catalog, electronic data, an electronic data file, or an electronic user interface (see FIG. 6). For example, as shown in FIG. 4, the indicator 17 can be provided by a label having indicia thereon associated with the indicator portion attached to an end portion of the container 16, but various other positions of the indicator can be provided as well as understood by those skilled in the art.

As shown in FIGS. 1-11 and as described above, the present invention also provides methods of forming a seal kit, methods of using a seal kit, and methods of doing business. An embodiment of a method of forming a seal kit 15 includes providing a container 16 and positioning a plurality of subsets 20, 30, 40 of a plurality of seals 21, 31, 41 for at least two different air conditioning systems 50 within the container 16 so that a combined total number of the plurality of seals of all of the subsets 20, 30, 40 defines a set of a plurality of seals. Each of the plurality of subsets 20, 30, 40 of the plurality of seals 21, 31, 41 preferably is enough of a plurality of seals to completely retrofit at least one of the at least two different air conditioning systems 50 and having at least one seal in common with at least one other of the plurality of subsets of the plurality of seals. The method also can include indicating at least two different air conditioning systems 50 to which the plurality of subsets 20, 30, 40 operatively retrofit (see, e.g., FIGS. 4 and 7).

Another embodiment of the present invention, for example, provides a method of forming a seal kit 15 which includes determining a set of a plurality of seals of an air conditioning system 50 of a first vehicle 20, determining a set of a plurality of seals 20, 30, 40 of an air conditioning system 50 of a second vehicle 30, and determining a set of a plurality seals needed to retrofit a set of the plurality of seals 20, 30, 40 of only one of the air conditioning systems 50 of the first and second vehicles. The set of the plurality of seals 20, 30, 40 preferably is less than the total combined number of seals needed to retrofit a set of the plurality of seals 20, 30, 40 of both the air conditioning systems 50 of the first and second vehicles and greater than a set of the plurality of seals 20, 30, 40 of only one of the air conditioning systems of the first and second vehicles. The method also includes positioning the determined set of the plurality of seals into a container 16. The method also can include associating an indicator with the container 16 to indicate the first and second vehicles to which the set of a plurality of seals 20, 30, 40 operatively retrofits. The indicator 17 preferably includes at least the make and model of each of the first and second vehicles.

Figure 3:
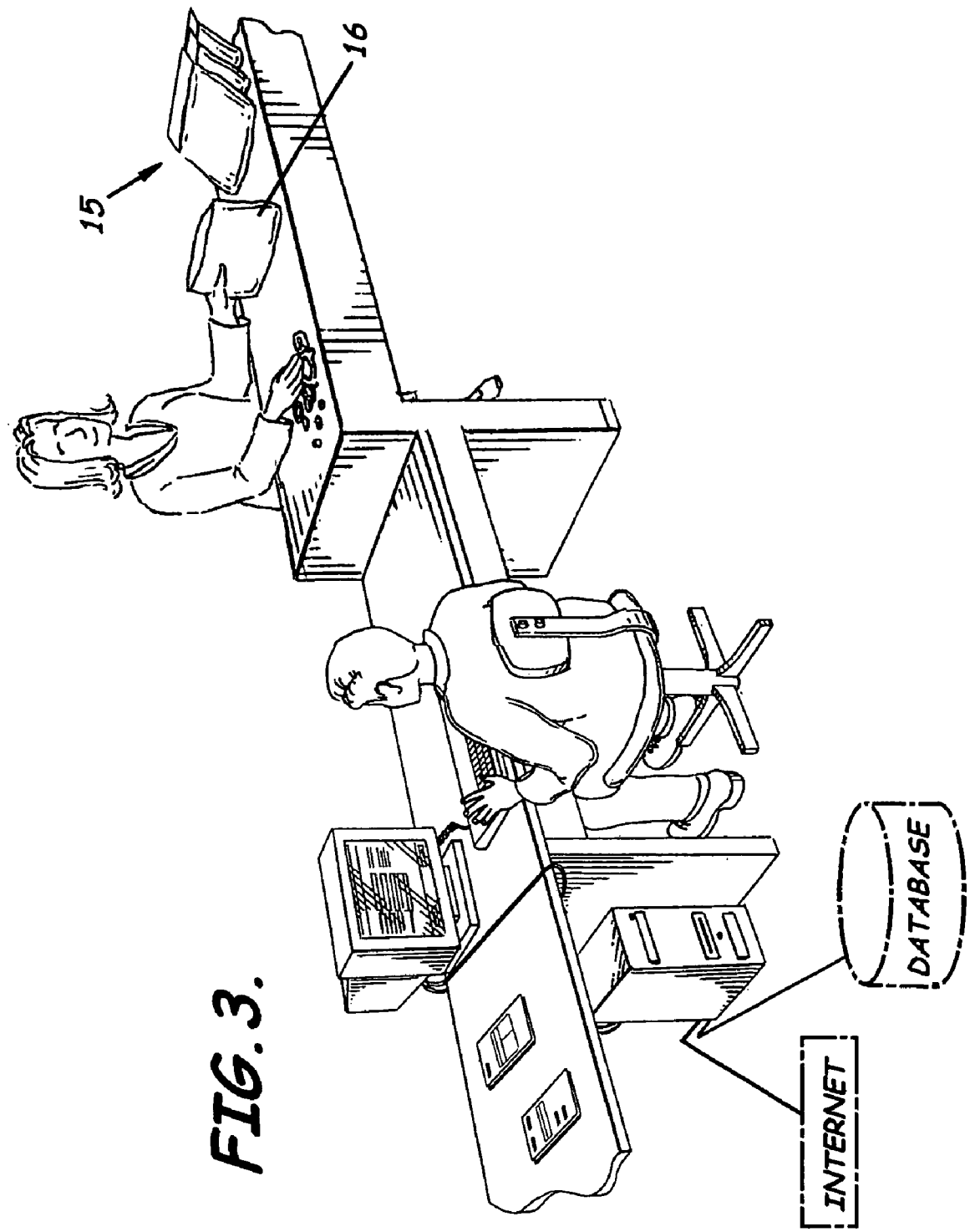
FIG. 3 is an environmental view of a seal kit to make system fluid circulation connections associated with a vehicle air conditioning system being formed according to an embodiment of the present invention and a system to research seals needed in forming or to identify a seal kit for making substantially all of the system fluid circulation connections associated with a plurality of different vehicle air conditioning systems of a plurality of different vehicles of an embodiment of the present invention.
Figure 7:
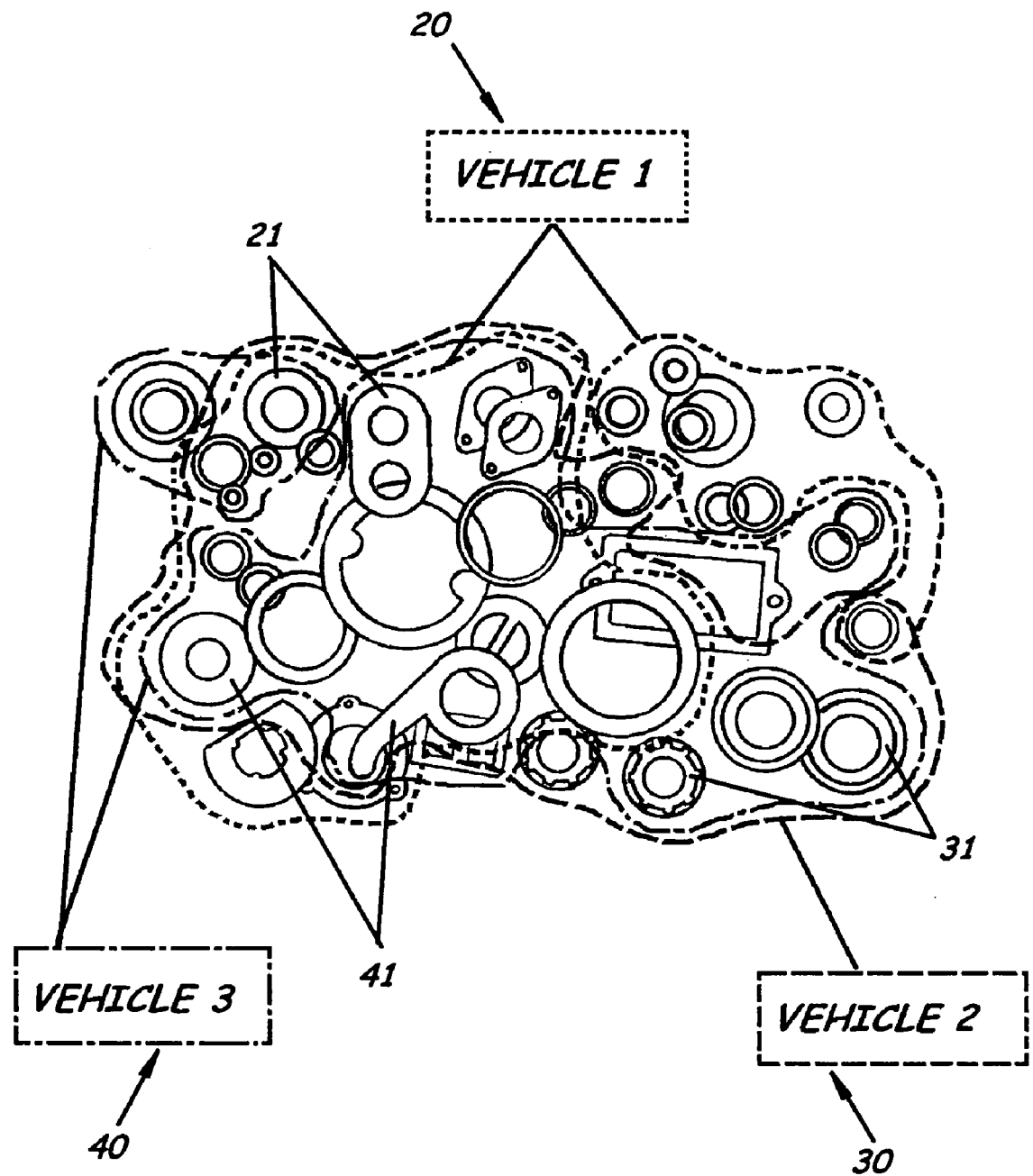
FIG. 7 is a front plan view of a seal kit to make system fluid circulation connections in a vehicle air conditioning system illustrating the overlapping of seals within the container for first, second, and third vehicles according to an embodiment of the present invention.
Figure 8:
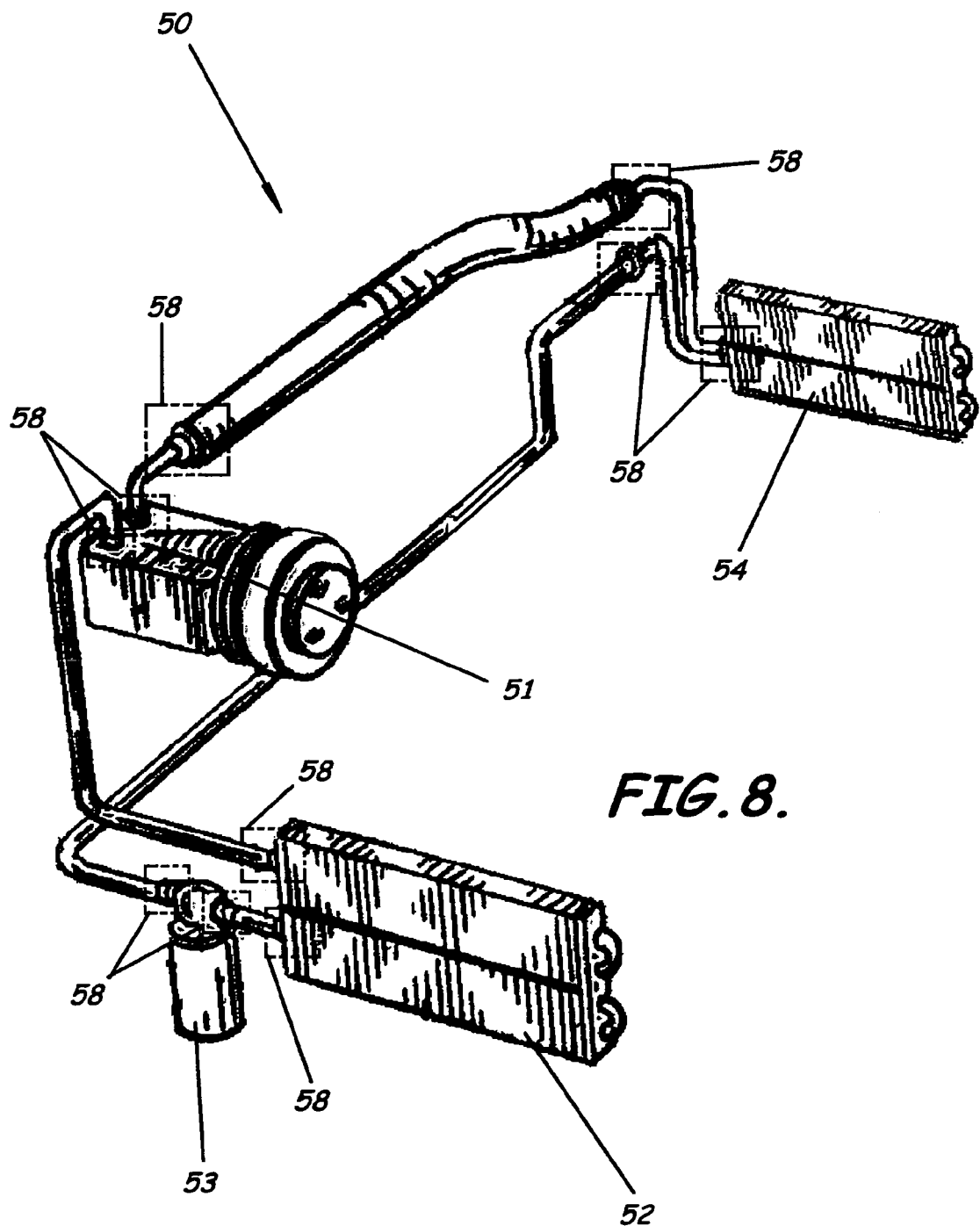
FIG. 8 is a perspective view of seal locations for a plurality of system fluid circulation connections associated with a vehicle air conditioning system according to an embodiment of the present invention.
Figure 9A:
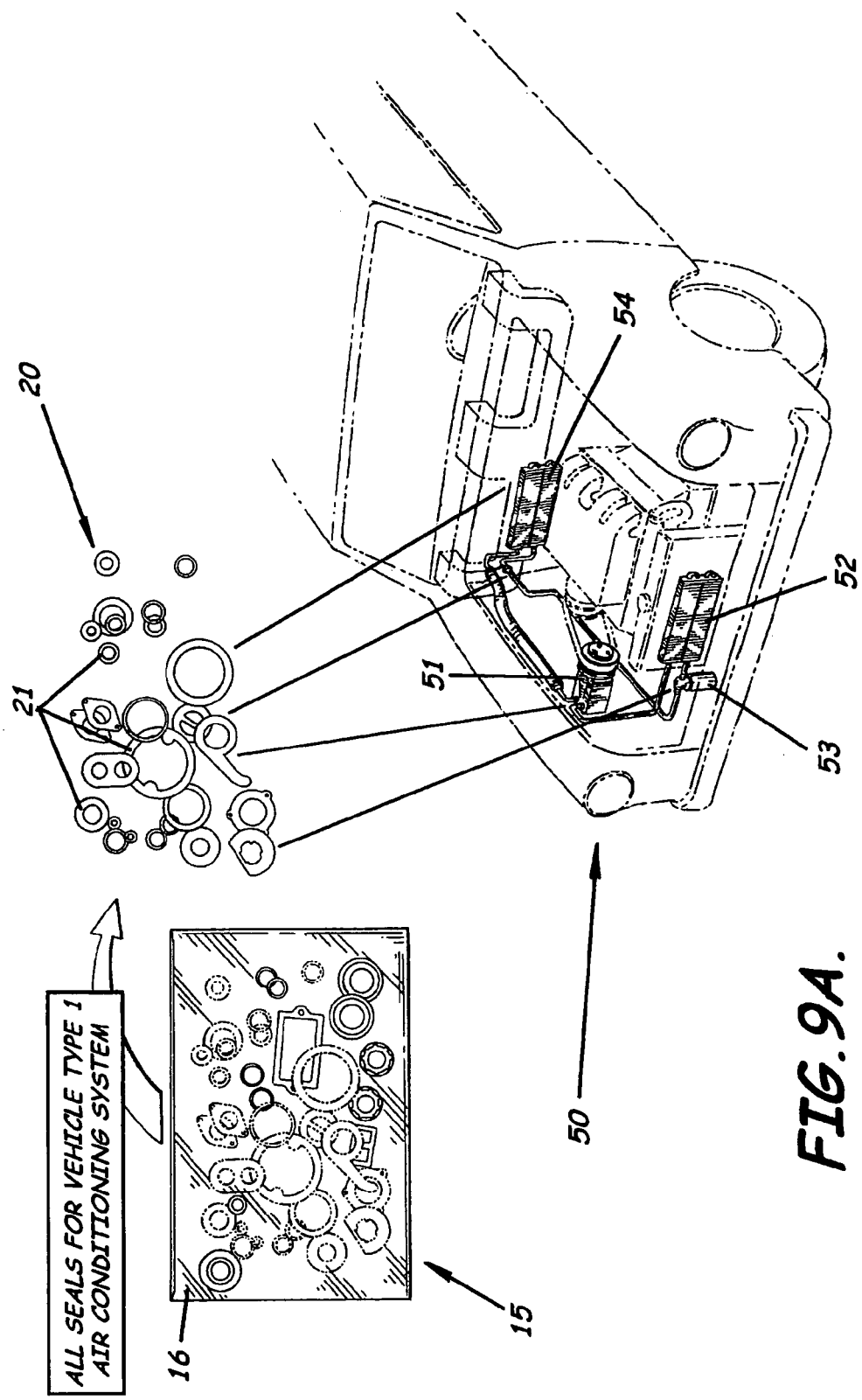
FIG. 9A is a front plan view of a seal kit to make system fluid circulation connections in a vehicle air conditioning system illustrating a set of a plurality of different seals of an air conditioning system of a first vehicle being removed therefrom and having additional seals remaining in a container of the seal kit according to an embodiment of the present invention.
Figure 9B:
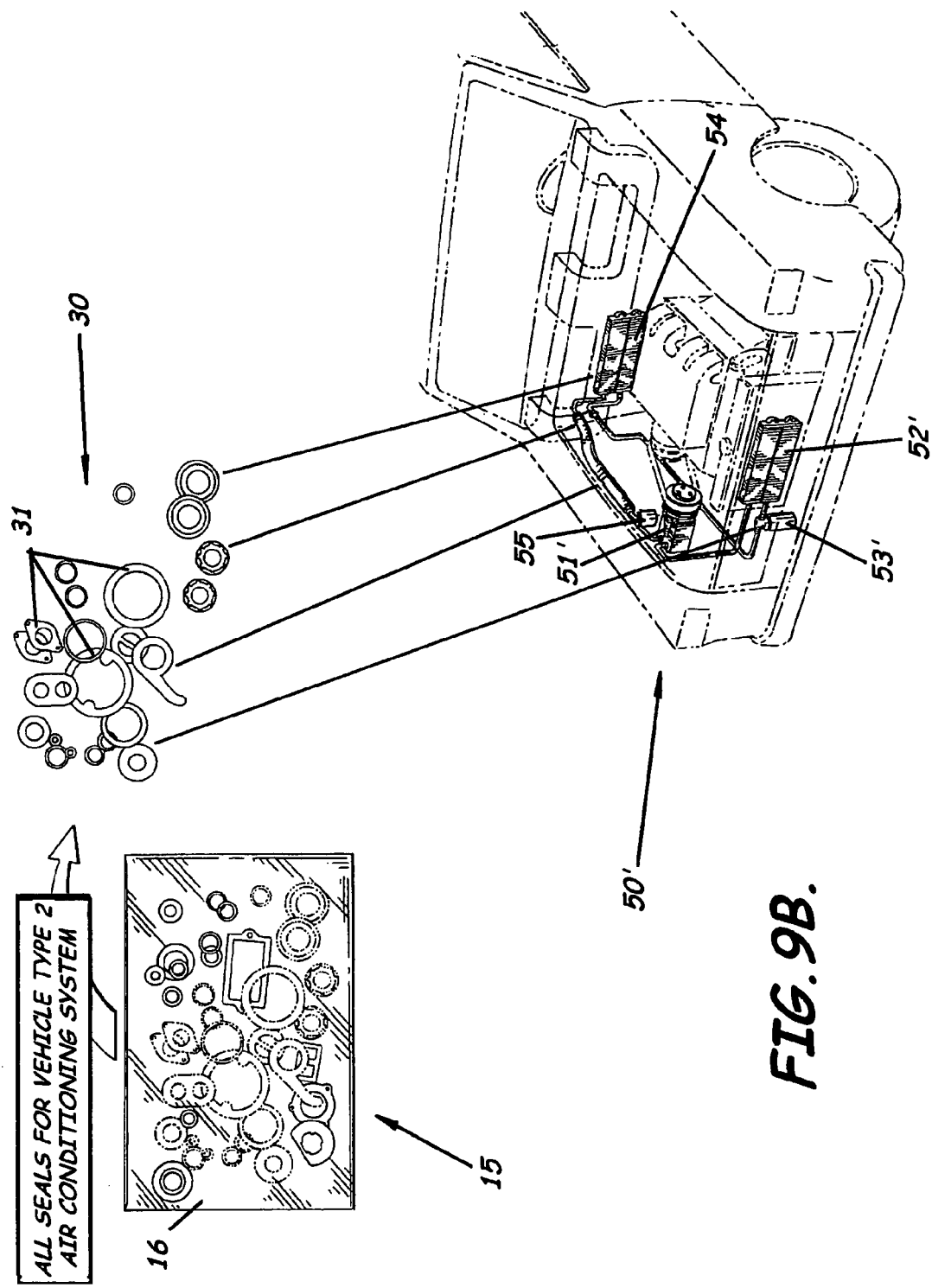
FIG. 9B is a front plan view of a seal kit to make system fluid circulation connections in a vehicle air conditioning system of FIG. 9A illustrating a set of a plurality of different seals of a vehicle air conditioning system of a second vehicle being removed therefrom and having additional seals remaining in the container of the seal kit according to an embodiment of the present invention.

As shown in FIGS. 3 and 8, for example, in forming 60 the seal kit 15, for example, research is conducted on what seals are needed for each make and model of vehicle for an air conditioning system, e.g., air conditioner, associated with that make and model of vehicle (block 61). For example, such as shown in FIG. 3, the research can be conducted on a computer having access to a global communication network such as the world wide web through the Internet having access to one or more databases or through separate stand-alone or intranet type databases as well as understood by those skilled in the art. Alternatively, each of the manufacturers or suppliers of air conditioning systems can be researched and the associated seals with each air conditioning system of the manufacturers or suppliers researched as well. Then, vehicles can be researched which have a particular type of air conditioning system. After using either research technique, a set of the seals are then acquired from a supplier, a manufacturer, a distributor, or otherwise manufactured directly and sorted and grouped into a seal kit 15, 15' (see FIGS. 3-6) covering at least two vehicles (block 62). A determination can be made from the database as to which vehicles use similar sets of seals (block 63). Vehicles that can be serviced by one package or container of seals with the least amount of seals remaining can be grouped together (block 64). Enough seals for making all or substantially all of the fluid connections for system each of the at least two vehicles, and extra seals not used for one of the at least two vehicles due to the overlap of types of seals between the vehicles. All seals that need to be packaged together to cover servicing of any vehicle in that group can be determined (block 65) and a database of seal kits and which vehicles each kit will service can be compiled (block 66). The container 16, by a label, some type of code, or other indicator 17, can identify or indicate which group of vehicles for which the seal kit 15 can be used for air conditioning systems 50 for those vehicles (block 67) such as the air conditioning system of those vehicles. This can be done numerous ways as understood by those skilled in the art such as by assigning a part number to each package or container of seals that will service any of a preselected or predetermined group of vehicles (block 67).

The method of forming can also include determining at least one seal of a first set of the plurality of seals 21, 31, 41 of the air conditioning system of the first vehicle that is the same seal as at least one of a second set of the plurality of seals 21, 31, 41 of the air conditioning system 50 of the second vehicle so that the at least one seal defines at least one common seal (block 62). The step of determining the set of plurality of seals 21, 31, 41 needed to retrofit a set of the seals of only of the air conditioning systems 50 can include determining that only one of the at least one common seal is within the set 20, 30, 40 of the plurality of seals 21, 31, 41 to thereby reduce the number of seals needed. The method can also include determining a third set of a plurality of seals 41 of an air conditioning system 50 of a third vehicle, e.g., at least one other vehicles or multiple other vehicles, and determining that none of the seals of at least one of a set of the plurality seals 21 of the air conditioning system 50 of the first vehicle and a set of the plurality of seals 31 of the air conditioning system of the second vehicle are the same so that no seals are found to be in common. Alternatively, for example, the method can include determining a set of a plurality of seals 41 of an air conditioning system 50 of a third vehicle, determining at least one seal of a set of the plurality of seals 41 of the air conditioning system 50 of the third vehicle that is the same seal as at least one of a set of the plurality of seals 21 of the air conditioning system 50 of the first vehicle so that the at least one seal defines at least one common seal, and determining a plurality of seals 21 of a set of the plurality of seals of the air conditioning system 50 of the first vehicle that are the same plurality of seals of a set of the seals of the plurality of seals 31 of the air conditioning system 50 of the second vehicle so that the plurality of seals defines a plurality of common seals. The plurality of common seals preferably are greater than the at least one common seal so that the number of common seals between the air conditioning systems of the first and second vehicles is greater than the number of common seals between the air conditioning systems of the first and third vehicles.

The method still also can include the steps of determining a first set 20 of the plurality of seals 21 of the vehicle air conditioning system 50 of the first vehicle and determining a second set 30 of the plurality of seals 31 of the vehicle air conditioning system 50 of the second vehicle each includes conducting research into a manufacturer (including supplier or vehicle manufacturer) of the vehicle air conditioning system 50 to determine a third set of the seals of the vehicle air conditioning system of the first and second vehicles or the alternative as described above. Then, the method can include determining at least one seal of a first set of the plurality of seals 21 of the air conditioning system 50 of the first vehicle that is the same seal as at least one of a second set of the plurality of seals 31 of the air conditioning system 50 of the second vehicle so that the at least one seal defines at least one common seal. The step of determining the set of plurality of seals 20, 30, 40 needed to retrofit a set of the seals of only of the air conditioning systems 50 includes determining that only one of the at least one common seal is within the set of the plurality of seals to thereby reduce the number of seals needed.

An embodiment of the present invention additionally provides a method of using a seal kit 15 such as shown in FIGS. 1-2, 8-10, and 11. The method of using includes opening a container 16 having a set 20, 30, 40 of a plurality seals 21, 31, 41 positioned therein and needed to retrofit a set of a plurality of existing seals needed to make system fluid connections in only one air conditioning system 50 of a plurality of air conditioning systems 50, 50', 50" of a plurality of vehicles. The total number of seals in the set 20, 30, 40 of the plurality of retrofit seals 21, 31, 41 preferably is less than the total combined number of seals needed to retrofit all of the existing seals needed to make system fluid connections in all of the plurality of the vehicle air conditioning systems of the plurality of vehicles and greater than a set of the plurality of seals of only one of the air conditioning systems of the plurality of vehicles. The combination of the container 16 and the set 20, 30, 40 of the plurality of seals 21, 31, 41 contained therein define a seal kit 15. The method also includes replacing at least one of the plurality of seals 21, 31, 41 of the only one air conditioning system 50 of the plurality of air conditioning systems of the plurality of vehicles with at least one corresponding seal from the seal kit 15. The method can also include selecting an air conditioning system 50, 50', 50", of a particular make and model of a vehicle that corresponds to the container 16 prior to the step of opening the container 16. The container 16 preferably has an indicator 17 associated therewith to indicate the particular year, make, model, and engine type of the vehicle for the air conditioning system 50. The method can further include removing the at least one of the plurality of seals 20, 30, 40 from the container 16 of the seal kit 15 prior to the step of replacing the at least one of the plurality of seals 21, 31, 41. The air conditioning system 50, for example, advantageously can be an air conditioning system, and at least two of the plurality of seals 21, 31, 41 of the set 20, 30, 40 of the seal kit 15 can have different shaped outer perimeters.

An embodiment of the present invention further provides a method of doing business. The method of doing business includes providing a container 16 having a set 20, 30, 40 of a plurality of retrofit seals 21, 31, 41 needed to retrofit a set of a plurality of existing seals of only one vehicle air conditioning system 50 of a plurality of air conditioning systems of a plurality of vehicles. The total number of seals in the set (combination of subsets 20, 30, 40) of the plurality of seals 21, 31, 41 preferably is less than the total combined number of seals needed to retrofit a set of the plurality of seals of the air conditioning systems 50 of the plurality of vehicles and greater than a set of the plurality of seals of only one of the air conditioning systems of the plurality of vehicles. The combination of the container 16 and the set 20, 30, 40 of the plurality of seals 21, 31, 41 contained therein define a seal kit 15. The method can also include providing a plurality of the seal kits 15. Each of the plurality of seal kits 15 has a different set 20, 30, 40 of a plurality of seals 21, 31, 41. The method can also include selling the plurality of seal kits 15 to a distributor of vehicle component parts. Each of the plurality of seal kits 15 has an indicator 17 associated therewith to indicate a plurality of makes and models of vehicles to which the plurality of seals 20, 30, 40 operatively retrofit a corresponding air conditioning system 50 thereof.

The method can also include storing the plurality of seal kits 15 at a distributor facility of the distributor, identifying a user's desire for a replacement of at least one seal of an air conditioning system 50 of a particular make and model of a vehicle, selecting one of the plurality of seal kits 15 that indicates the particular make and model of the vehicle, and distributing the selected one of the plurality of seal kits 15 to the user from the distributor facility. The method can further include providing a plurality of the seal kits 15. Each of the plurality of seal kits 15 has a different set 20, 30, 40 of a plurality of seals 21, 31, 41 and has an indicator 17 associated therewith to indicate a plurality of makes and models of vehicles to which the plurality of seals 21, 31, 41 operatively retrofit a corresponding air conditioning system 50 thereof. The method can still further include identifying a user's desire for a replacement of at least one seal of an air conditioning system 50 of a particular make and model of a vehicle, selecting one of the plurality of seal kits 15 that indicates the particular make and model of the vehicle, and distributing the selected one of the plurality of seal kits 15 to the user. The method yet further can include providing a plurality of the seal kits 15, storing the plurality of seals kits 15 at a selected location, and distributing the plurality of seal kits 15. The only one air conditioning system 50 and the plurality of air conditioning systems 50 each can be provided by an air conditioning system, and at least two of the plurality of seals 21, 31, 41 of the set 20, 30, 40 of each of the plurality of seal kits 15 can have different shaped outer perimeters.

Another method of doing business also is provided which includes distributing a seal kit 15 having at least one replacement seal contained therein as one of a plurality of seals 20, 30, 40. The seal kit 15 indicates a plurality of makes and models of a plurality of vehicles and has a set of the seals of an air conditioning system 50 of any one of the plurality of vehicles contained therein to thereby reduce the time needed to select the at least one replacement seal for an air conditioning system 50 of a particular make and model of a vehicle. The method can also include the seal kit 15 having a container 16 containing a set of a plurality seals 20, 30, 40 needed to retrofit a set of a plurality of seals of only one air conditioning system 50 of a plurality of air conditioning systems of the plurality of vehicles. The set of the plurality of seals 20, 30, 40 preferably is less than the total combined number of seals needed to retrofit a set of the plurality of seals 20, 30, 40 of the air conditioning systems 50 of the plurality of vehicles and greater than a set of the plurality of seals of only one of the air conditioning systems of the plurality of vehicles. The method also can include providing a plurality of the seal kits 15 each of which have a different set or subset 20, 30, 40 of a plurality of seals 21, 31, 41, and selling the plurality of seal kits 15 to a distributor of vehicle component parts. Each the plurality of seal kits 15 has an indicator 17 associated therewith to indicate a plurality of makes and models of vehicles to which the plurality of seals 21, 31, 41 operatively retrofit a corresponding air conditioning system 50 thereof. This method can also include storing the plurality of seal kits 15 at a distributor facility of the distributor, identifying a user's desire for a replacement of at least one seal of an air conditioning system 50 of a particular make and model of a vehicle, selecting one of the plurality of seal kits 15 that indicates the particular make and model of the vehicle, and distributing the selected one of the plurality of seal kits 15 to the user from the distributor facility.

A method of doing business, according to yet another embodiment of the present invention, includes providing a seal kit 15, 15' having at least one replacement or retrofit seal contained therein as one of a set of a plurality of seals 21, 31, 41 in the seal kit 15, 15' needed to make system fluid connections in a vehicle air conditioning system. The seal kit 15, 15' can have associated therewith an indication of at least one of a plurality of vehicles having the vehicle air conditioning system associated therewith to thereby reduce the amount of time needed to select the at least one replacement seal for the vehicle air conditioning system of a particular vehicle. The seal kit can include a container having a set of a plurality of seals needed to retrofit a set of a plurality of existing seals of only one air conditioning system of a plurality of vehicle air conditioning systems of the plurality of vehicles. The total number of seals in the set of the plurality of seals preferably is less than the total combined number of existing seals needed to retrofit a set of the plurality of existing seals of all of the air conditioning systems of all of the plurality of vehicles and greater than a set of the plurality of seals of only one of the air conditioning systems of the plurality of vehicles. A plurality of seal kits can also be provided as described above herein according to this embodiment. The method can also include storing the plurality of seal kits at a selected location to thereby reduce the amount of inventory of seals otherwise, needed for distributing such as when otherwise storing large quantities of individual seals.

Further still, embodiments of the present invention can also include a method of doing business which includes identifying at least one component of a vehicle air conditioning system, such as one of the system fluid connection components, e.g., dryer, condenser, evaporator, compressor, expansion valve, accumulator, and/or one or more hoses, linking a seal kit, such as described herein, to the at least one component so that the seal kit can be offered for sale with the at least one component. For example, this allows the ability to link this type of particular seal kit to a component or other air conditioning system item that a retail store or other component distributor is selling. Such linking can be accomplished by electronic data storage, computers, databases, catalogs, look up table, and other references by codes, icons, or other techniques as understood by those skilled in the art. If a compressor is being located for selling to a customer, then a seal kit associated with that compressor can be offered for sale as well. Embodiments of the present invention provide a specific seal kit to an air conditioning component requiring seal connections during service so that when the air conditioning system is sold to the consumer or customer, the customer is notified that a seal kit is available for this specific component connections and other system connections on the customer's vehicle. The method can also include offering the linked seal kit for sell to a potential purchaser of the at least one component and selling the linked seal kit and the at least one component to the potential purchaser so that the potential purchaser defines an actual purchaser.

In the drawings and specification, there have been disclosed embodiments of the invention and, although specific terms are employed, they are used in a generic and descriptive sense only and not for the purpose of limitation, the scope of the invention being set forth in the following claims.

The invention claimed is:

1. A method of forming a seal kit, the method comprising:
   determining a first set of a plurality of seals needed to make system fluid connections in an air conditioning system of a first vehicle;
   determining a second set of a plurality of seals needed to make system fluid connections in an air conditioning system of a second vehicle;
   determining a third set of a plurality seals needed to replace a set of the plurality of seals needed to make system fluid connections in only one of the air conditioning systems of the first and second vehicles, the total number of seals in the third set of the plurality of seals being less than the total combined number of seals needed to replace all of the plurality of seals of both the air conditioning systems of the first and second vehicles; and
   positioning the determined third set of the plurality of seals into a container.

2. A method as defined in claim 1, further comprising associating an indicator with the container to indicate the first and second vehicles to which the set of a plurality of seals operatively replaces system fluid connections of the air conditioning systems thereof, the indicator including at least the make and model of each of the first and second vehicles.

3. A method as defined in claim 1, further comprising determining at least one seal of the first set of the plurality of seals needed to make system fluid connections in the air conditioning system of the first vehicle that is the same seal as at least one seal of the second set of the plurality of seals of the air conditioning system of the second vehicle so that the at least one seal of the first set defines at least one common seal, and wherein the step of determining the third set of plurality of seals needed to replace the set of the plurality of seals of only one of the vehicle air conditioning systems includes determining that the at least one common seal is within the third set of the plurality of seals to thereby reduce the number of seals needed for the third set.

4. A method as defined in claim 1, further comprising determining a fourth set of a plurality of seals needed to make system fluid connections in an air conditioning system of at least one other vehicle and determining that none of the seals in at least one of the first set of the plurality seals of the air conditioning system of the first vehicle and the second set of the plurality of seals of the air conditioning system of the second vehicle are the same so that no seals are found to be in common.

5. A method as defined in claim 1, further comprising determining a fourth set of a plurality of seals need to make system fluid connections in an air conditioning system of a third vehicle, determining at least one seal of the fourth set of the plurality of seals that is the same seal as at least one of the first set of the plurality of seals of the air conditioning system of the first vehicle and the second set of the plurality of seals of the air conditioning system of the second vehicle so that the at least one seal defines at least one common seal.

6. A method as defined in claim 5, further comprising determining a plurality of seals of the first set of the plurality of seals of the air conditioning system of the first vehicle that are the same plurality of seals in the second set of the seals of the plurality of seals of the air conditioning system of the second vehicle so that the plurality of seals defines a plurality of common seals, the plurality of common seals being greater than the at least one common seal of the air conditioning system of the third vehicle so that the number of common seals between the air conditioning systems of the first and second vehicles is greater than the number of common seals between the air conditioning systems of the first and third vehicles.

7. A method as defined in claim 1, wherein the steps of determining the first set of the plurality of seals of the air conditioning system of the first vehicle and determining the second set of the plurality of seals of the air conditioning system of the second vehicle each comprises conducting research into a manufacturer of the air conditioning system to determine the first and second sets of the seals of the air conditioning system of the first and second vehicles.

8. A method of forming a seal kit, the method comprising:
providing a container; and
positioning a plurality of subsets of a plurality of seals for at least two different vehicle air conditioning systems within the container so that a combined total number of the plurality of seals of all of the plurality of subsets defines a set of a plurality of seals, each of the plurality of subsets of the plurality of seals being enough of a plurality of seals to completely replace a preselected group of seals used in making air conditioning system fluid connections in at least one of the at least two different vehicle air conditioning systems and having at least one seal in common with at least one other of the plurality of subsets of the plurality of seals.

9. A method as defined in claim 8, further comprising indicating at least two different vehicle air conditioning systems to which the plurality of subsets operatively replace.

10. A method as defined in claim 9, wherein the plurality of seals of each of the plurality of subsets comprise a preselected plurality of seals needed to make system fluid connections in the at least two different vehicle air conditioning systems, and wherein at least two of the plurality of seals of the plurality of subsets of the plurality of seals have different shaped outer perimeters.

11. A method of forming a seal kit, the method comprising:
determining a first set of a plurality of seals needed to make system fluid connections in a first system of a first vehicle;
determining a second set of a plurality of seals needed to make system fluid connections in a second system of a second vehicle;
determining a third set of a plurality seals needed to replace a set of the plurality of seals needed to make system fluid connections in only one of the first and second systems of the first and second vehicles, the total number of seals in the third set of the plurality of seals being less than the total combined number of seals needed to replace all of the plurality of seals of both the first and second systems of the first and second vehicles; and
positioning the determined third set of the plurality of seals into a container.

12. A method as defined in claim 11, further comprising associating an indicator with the container to indicate the first and second vehicles to which the set of a plurality of seals operatively replaces system fluid connections of the first and second systems thereof, the indicator including at least the make and model of each of the first and second vehicles.

13. A method as defined in claim 12, wherein the steps of determining the first set of the plurality of seals of the first system of the first vehicle and determining the second set of the plurality of seals of the second system of the second vehicle each comprises conducting research into a manufacturer of the first and second systems to determine the first and second sets of the seals of the first and second systems of the first and second vehicles, and wherein each of the first and second systems comprise an air conditioning system of the first and second vehicles.

14. A method as defined in claim 11, further comprising determining at least one seal of the first set of the plurality of seals needed to make system fluid connections in the first system of the first vehicle that is the same seal as at least one seal of the second set of the plurality of seals of the second system of the second vehicle so that the at least one seal of the first set defines at least one common seal, and wherein the step of determining the third set of plurality of seals needed to replace the set of the plurality of seals of only one of the first and second systems includes determining that the at least one common seal is within the third set of the plurality of seals to thereby reduce the number of seals needed for the third set.

15. A method as defined in claim 11, further comprising determining a fourth set of a plurality of seals needed to make system fluid connections in a third system of at least one other vehicle and determining that none of the seals in at least one of the first set of the plurality seals of the first system of the first vehicle and the second set of the plurality of seals of the second system of the second vehicle are the same so that no seals are found to be in common.

16. A method as defined in claim 11, further comprising determining a fourth set of a plurality of seals need to make system fluid connections in a third system of a third vehicle, determining at least one seal of the fourth set of the plurality of seals that is the same seal as at least one of the first set of the plurality of seals of the first system of the first vehicle and the second set of the plurality of seals of the second system of the second vehicle so that the at least one seal defines at least one common seal.

17. A method as defined in claim 16, further comprising determining a plurality of seals of the first set of the plurality of seals of the first system of the first vehicle that are the same plurality of seals in the second set of the seals of the plurality of seals of the second system of the second vehicle so that the plurality of seals defines a plurality of common seals, the plurality of common seals being greater than the at least one common seal of the third system of the third vehicle so that the number of common seals between the first and second systems of the first and second vehicles is greater than the number of common seals between the first and third systems of the first and third vehicles, and wherein the first, second, and third systems each comprises the same type of system of the first, second, and third vehicles.

18. A method of forming an automotive vehicle air conditioning system seal kit, the method comprising the steps of:
    determining a first set of a plurality of seals needed to replace automotive vehicle air conditioning system fluid circulation line connection seals for a corresponding first set of automotive vehicle air conditioning fluid line connections in an automotive vehicle air conditioning system of a first vehicle;
    determining a second set of a plurality of seals needed to replace automotive vehicle air conditioning system fluid circulation line connection seals for a corresponding second set of automotive vehicle air conditioning fluid line connections in an automotive vehicle air conditioning system of a second vehicle, the second set of automotive vehicle air conditioning circulation line connection seals including at least one an automotive vehicle air conditioning system fluid circulation line connection seal being the same as a corresponding at least one automotive vehicle air conditioning system fluid circulation line connection seal of the first set of seals and including at least one automotive vehicle air conditioning system fluid circulation line connection seal different from each automotive vehicle air conditioning system fluid circulation line connection seal of the first set of seals;
    selecting a third set of a plurality of seals from the first and second sets of seals for inclusion in a seal kit, the total number of seals in the third set of the plurality of seals being less than the total combined number of seals of the first and second sets of seals, the third set of seals being sufficient in both size and number of seals needed to replace the automotive vehicle air conditioning system fluid circulation line connection seals for any one of the first and second sets of automotive vehicle air conditioning fluid line connections, but insufficient to replace each automotive vehicle air conditioning system fluid circulation line connection seal for the first vehicle replaced by the first set of seals and each vehicle air conditioning system fluid circulation line connection seal for the second vehicle replaced by the second set of seals when either the seals needed to replace the first set of automotive vehicle air conditioning fluid line connections for the first vehicle or the seals needed to replace the second set of automotive vehicle air conditioning fluid line connections for the second vehicle are operatively extracted from the third set of seals; and
    positioning the selected third set of seals into a container.

19. A method as defined in claim 18, further comprising the step of associating an indicator with the container to indicate the first and second vehicles having automotive vehicle air conditioning system fluid connection seals to which the third set of a plurality of seals operatively replaces, the indicator including at least the make, model, and year of each of the first and second vehicles.

20. A method as defined in claim 18, further comprising the step of determining at least one seal of the first set of the plurality of seals needed to make automotive vehicle air conditioning system fluid connections in the air conditioning system of the first vehicle that is the same size and type of seal as at least one seal of the second set of the plurality of seals of the air conditioning system of the second vehicle so that the at least one seal of the first set defines at least one common seal, and wherein the step of selecting the third set of plurality of seals for inclusion in the seal kit includes determining that the at least one common seal is within the third set of the plurality of seals to thereby reduce the number of seals needed for the third set of seals.

21. A method as defined in claim 18, further comprising the step of determining a fourth set of a plurality of seals needed to replace a corresponding fourth set of automotive vehicle system fluid connections in an air conditioning system of at least one other vehicle, and determining that none of the seals in at least one of the first set of the plurality seals of the air conditioning system of the first vehicle and the second set of the plurality of seals of the air conditioning system of the second vehicle are the same as those seals in the fourth set of seals so that no seals are found to be in common.

22. A method as defined in claim 18, further comprising the step of determining a fourth set of a plurality of seals needed to replace a corresponding fourth set of automotive vehicle system fluid connections in an air conditioning system of a third vehicle, and determining at least one seal of the fourth set of seals that is the same size and type of seal as at least one of the first set of seals and the second set of seals so that the at least one seal of the fourth set of seals defines at least one common seal.

23. A method as defined in claim 22, further comprising the step of determining a plurality of seals of the first set of the plurality of seals of the air conditioning system of the first vehicle that are the same plurality of seals in the second set of the seals of the plurality of seals of the air conditioning system of the second vehicle so that the plurality of seals defines a plurality of common seals, the plurality of common seals being greater than the at least one common seal of the air conditioning system of the third vehicle so that the number of common seals between the air conditioning systems of the first and second vehicles is greater than the number of common seals between the air conditioning systems of the first and third vehicles.

24. A method as defined in claim 18, wherein the steps of determining the first set of a plurality of seals and determining the second set of a plurality of seals comprises conducting research into a manufacturer of the respective air conditioning systems to determine the first set of the seals needed to replace automotive vehicle air conditioning system fluid circulation line connection seals for the corresponding first set of automotive vehicle air conditioning fluid line connections in the automotive vehicle air conditioning system of the first vehicle, and to determine the second set of the seals needed to replace automotive vehicle air conditioning system fluid circulation line connection seals for the corresponding second set of automotive vehicle air conditioning fluid line connections in the automotive vehicle air conditioning system of the second vehicle.

25. A method of forming a seal kit, the method comprising the steps of:
    providing a container; and
    positioning a plurality of subsets of a plurality of seals for at least two different automotive vehicle air conditioning systems within the container so that a combined total number of the plurality of seals of all of the plurality of subsets defines a set of a plurality of seals, each of the plurality of subsets of the plurality of seals being enough of a plurality of seals to completely replace a first preselected group of seals used in making automotive vehicle air conditioning system fluid connections in at least one of the at least two different vehicle air conditioning systems and having at least one seal in common with at least one other of the plurality of subsets of the plurality of seals, and each of the plurality of subsets of the plurality of seals being not enough of a plurality of seals to completely replace a second preselected group of seals used in making automotive vehicle air conditioning system fluid connections in any of the at least two different vehicle air conditioning systems when the first preselected group of seals are operatively utilized.

26. A method as defined in claim 25, further comprising the step of providing an indicator with the container indicating make, model, and year associated with the at least two different vehicle air conditioning systems to which the plurality of subsets operatively replace, and wherein the container is devoid of air conditioning fittings and air conditioning system refrigerant.

27. A method as defined in claim 26, wherein at least two of the plurality of seals of the plurality of subsets of the plurality of seals has different shaped outer perimeters.

28. A method of forming an automotive vehicle air conditioning system seal kit, the method comprising the steps of:
  selecting a set of automotive vehicle air conditioning system replacement fluid circulation line connection seals for inclusion in a seal kit so that the selected set of seals operatively completely replace each existing fluid circulation line connection seal for each air conditioning system fluid circulation line connection of an air conditioning system of any one but only one single member vehicle of a preselected vehicle group comprising at least two different vehicle members each having an air conditioning system different from that of the other of the at least two different vehicle members, the selected set of seals comprising:
    a specific size and number of automotive vehicle air conditioning fluid circulation line connection seals selected to be sufficient to replace each existing fluid circulation line connection seal of each corresponding air conditioning system fluid circulation line connection of a respective air conditioning system of any one but only one single vehicle member of either one of the vehicle members within the preselected vehicle group defining a first selected vehicle member, the automotive vehicle air conditioning system fluid circulation line connection seals needed to replace each fluid circulation line connection seal of the vehicle air conditioning system for a first selected vehicle member defining a first group of automotive vehicle air conditioning system fluid circulation line connection seals, and
    the specific size and number of automotive vehicle air conditioning fluid circulation line connection seals selected to further be insufficient to replace each existing fluid circulation line connection seal of each corresponding air conditioning fluid circulation line connection of a respective air conditioning system of either of any other vehicle member of either one of the other vehicle members within the preselected vehicle group when the first group of automotive vehicle air conditioning system fluid circulation line connection seals are operatively utilized; and
  positioning the selected set of automotive vehicle air conditioning system replacement fluid circulation line connection seals into a container.

29. A method as defined in claim 28, wherein the first group of automotive vehicle air conditioning fluid circulation line connection seals further includes an automotive vehicle air conditioning system fluid circulation line connection seal different in size or type from each automotive vehicle air conditioning system fluid circulation line connection seal of a second group of seals needed to replace each vehicle air conditioning fluid connection seal for the any other vehicle member within the preselected vehicle group.

30. A method as defined in claim 28, further comprising the step of associating an indicator with the container to indicate inclusion of each vehicle member of the preselected vehicle group having an air conditioning system including fluid circulation line connection seals to which the selected set of automotive vehicle air conditioning system fluid circulation line connection seals operatively completely replaces, the preselected vehicle group comprising at least two different vehicle members each having air conditioning systems different from each other, the indicator identifying each vehicle member by make, model, and year so that a user can readily identify each vehicle member included in the preselected vehicle group by make, model, and year.

31. A method as defined in claim 30, wherein the at least two different vehicle members are indicated by the indicator as originating from at least two different manufacturers having different air conditioning systems including a common sub-set of fluid circulation line connection seals.

32. A method as defined in claim 31,
  wherein the indicator includes indicia indicating association of the seal kit with the only one single vehicle member of the preselected vehicle group and each of the other vehicle members of the preselected vehicle group to thereby aid the user in identifying which seal kit to retrieve for a specific make, model, and year vehicle member; and
  wherein the indicator references a part number thereon associated with the part number attached to the container.

33. A method as defined in claim 30, wherein the step of selecting a set of automotive vehicle air conditioning system replacement fluid circulation line connection seals for inclusion in a seal kit includes performing a vehicle study to ensure the selected set of seals includes each automotive vehicle air conditioning system fluid circulation line connection seal required for replacing each existing automotive vehicle air conditioning system fluid circulation line connection seal of the air conditioning system of any first selected single vehicle member of the at least two different vehicle members indicated by the indicator and an insufficient quantity required for replacing each existing automotive vehicle air conditioning system fluid circulation line connection seal of the air conditioning system of a second vehicle member of the at least two different vehicle members when all seals required for replacing the fluid circulation line connection seals for the first selected single vehicle member have been allotted.

34. A method as defined in claim 33, wherein the air conditioning system fluid circulation line connections for each vehicle member in the preselected vehicle group include those between a vehicle air conditioning system fluid circulation line and one of the following: a vehicle air conditioning system dryer, condenser, evaporator, compressor, expansion valve, accumulator, switch or sensor, and hose fittings where present.

35. A method as defined in claim 30, wherein the indicator indicates year, make, and model of each single vehicle member of the preselected vehicle group, and engine type when a vehicle member of the preselected vehicle group identified by year, make, and model has different air conditioning systems for different engine types.

36. A method as defined in claim 30, wherein the indicator indicates year, make, and model of each single vehicle member of the preselected vehicle group, and rear air conditioning when a vehicle member of the vehicle group identified by year, make, and model has front only and front and rear air conditioning systems for members of the same year, make, and model.

37. A method as defined in claim 28, wherein the step of selecting a set of automotive vehicle air conditioning system replacement fluid circulation line connection seals for inclusion in a seal kit includes selecting the vehicle members within the preselected vehicle group for association with the selected set of automotive vehicle air conditioning system fluid circulation line connection seals based on both commonality of required fluid circulation line connection seals and potential confusion caused by similar sized vehicle parts; and wherein the method further comprises the step of managing seals for candidate vehicle members with similar sized vehicle parts by separating the seals for the candidate vehicle members with similar sized vehicle parts into different seal kits to reduce user errors from misidentification and to allow the user to visually distinguish between each fluid circulation line connection seal in the automotive vehicle air conditioning system seal kit.

38. A method as defined in claim 28, wherein the step of selecting a set of automotive vehicle air conditioning system replacement fluid circulation line connection seals for inclusion in a seal kit includes selecting the vehicle members within the preselected vehicle group for association with the selected set of automotive vehicle air conditioning system fluid circulation line connection seals based on both the commonality of the seals and the cost of the seals; and wherein the method further comprises the step of separating a plurality of automotive vehicle air conditioning system fluid circulation line connection seals into a plurality of different automotive vehicle air conditioning system seal kits to reduce relative cost to the user below that of assortment kits.

39. A method as defined in claim 28, wherein the set of automotive vehicle air conditioning system fluid circulation line connection seals is selected to include at least one more size of fluid circulation line connection seal than needed to entirely operatively replace each existing fluid circulation line connection seal of the air conditioning system of one of the vehicle members of the preselected vehicle group; and wherein each fluid circulation line connection of each air conditioning system of each member vehicle of the preselected vehicle group comprises a connection between a respective vehicle air conditioning system fluid circulation line and two or more of the following: a vehicle air conditioning system drier, a vehicle air conditioning system condenser, a vehicle air conditioning system evaporator, a vehicle air conditioning system compressor, a vehicle air conditioning system expansion valve, or a vehicle air conditioning system accumulator.

* * * * *

UNITED STATES PATENT AND TRADEMARK OFFICE
CERTIFICATE OF CORRECTION

| | | |
|---|---|---|
| PATENT NO. | : 7,574,847 B2 | Page 1 of 1 |
| APPLICATION NO. | : 11/175618 | |
| DATED | : August 18, 2009 | |
| INVENTOR(S) | : Brezina et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 993 days.

Signed and Sealed this

Seventh Day of September, 2010

David J. Kappos
*Director of the United States Patent and Trademark Office*